United States Patent
Davidich et al.

(10) Patent No.: US 11,274,994 B2
(45) Date of Patent: Mar. 15, 2022

(54) METHOD FOR DETERMINING A PARAMETER OF A WHEEL OF AN OBSERVED RAILWAY VEHICLE AND EVALUATION UNIT

(71) Applicant: SIEMENS MOBILITY GMBH, Munich (DE)

(72) Inventors: Maria Davidich, Munich (DE); Udhayaraj Sivalingam, Munich (DE)

(73) Assignee: Siemens Mobility GmbH, Munich (DE)

( * ) Notice: Subject to any disclaimer, the term of this patent is extended or adjusted under 35 U.S.C. 154(b) by 320 days.

(21) Appl. No.: 16/478,567

(22) PCT Filed: Jan. 17, 2017

(86) PCT No.: PCT/EP2017/050883
§ 371 (c)(1),
(2) Date: Jul. 17, 2019

(87) PCT Pub. No.: WO2018/133922
PCT Pub. Date: Jul. 26, 2018

(65) Prior Publication Data
US 2019/0339167 A1    Nov. 7, 2019

(51) Int. Cl.
*G01M 17/10* (2006.01)
*B61K 9/12* (2006.01)
*B61L 25/02* (2006.01)

(52) U.S. Cl.
CPC ............ *G01M 17/10* (2013.01); *B61K 9/12* (2013.01); *B61L 25/021* (2013.01); *B61L 25/025* (2013.01)

(58) Field of Classification Search
CPC ........ G01M 17/10; B61K 9/12; B61L 25/021; B61L 25/025
See application file for complete search history.

(56) References Cited

U.S. PATENT DOCUMENTS 11,067,496 B2 * 7/2021 Dubois ................ G01N 19/08
2009/0326733 A1 * 12/2009 Abele .................... B60T 8/172
701/1
(Continued)

FOREIGN PATENT DOCUMENTS

EP    1548419 A1    6/2005
RU    2203819 C2    5/2003

OTHER PUBLICATIONS

Yang Lijun, et al.:"Prediction Study on Anti-Slide Control of Railway Vehicle Based on RBF Neural Networks", Physics Procedia, vol. 25, Jan. 1, 2012.

*Primary Examiner* — Jason C Smith
(74) *Attorney, Agent, or Firm* — Laurence A. Greenberg; Werner H. Stemer; Ralph E. Locher

(57) ABSTRACT

An evaluation unit is fed with driving-related diagnostic data of a reference railway vehicle. The diagnostic data contain driving-related properties, on which a parameter of the wheel of the reference railway vehicle depends. The evaluation unit is also fed with wheel measurement data with measured values of the parameter of the wheel of the reference railway vehicle. The evaluation unit determines a function between the driving-related diagnostic data and the wheel measurement data via a supervised learning algorithm. The evaluation unit is fed with driving-related diagnostic data containing driving-related properties of an observed railway vehicle, on which a parameter of the wheel of the observed railway vehicle depends. The parameter of the wheel of the observed railway vehicle is determined by the evaluation unit using the determined function and the diagnostic data of the observed railway vehicle.

16 Claims, 2 Drawing Sheets

(56) References Cited

U.S. PATENT DOCUMENTS

2019/0339167 A1* 11/2019 Davidich .............. B61L 25/025
2019/0347875 A1* 11/2019 Ling ........................ G06N 5/04
2021/0143659 A1*  5/2021 Franchitti ........... B61L 27/0077

* cited by examiner

METHOD FOR DETERMINING A PARAMETER OF A WHEEL OF AN OBSERVED RAILWAY VEHICLE AND EVALUATION UNIT

BACKGROUND OF THE INVENTION

Field of the Invention

The invention relates to a method for determining a parameter of a wheel of an observed railway vehicle.

Wheel Parameters, like the diameter, the wheel flange width and the wheel flange height, change over time due to abrasion. These changes effect the dynamic characteristic of the railway vehicle and even may influence the safety of the railway vehicle. Therefore, wheel parameters are measured regularly. If the wheel flange width and/or the wheel flange height reach(es) some critical value, the wheel needs to be re-profiled. Moreover, due to abrasion and due to re-profiling, the diameter of the wheel decreases over time. If the diameter of the wheel reaches some critical value, the wheel needs to be exchanged.

Regularly wheel measurements are time consuming and, thus, expensive. However, they are necessary to find the optimal point of time for re-profiling or exchanging the wheel.

One objective of the invention is to provide an enhanced method for determining a parameter of a wheel of a railway vehicle, particularly wherein the number of wheel measurements can be reduced.

This objective is accomplished by means of a method as claimed. In the method for determining a parameter of a wheel of an observed railway vehicle, according to the invention, an evaluation unit is fed with driving-related diagnostic data of at least one reference railway vehicle, which diagnostic data comprise driving-related properties, on which the parameter of a wheel of the reference railway vehicle depends. According to the invention, the evaluation unit is fed with wheel measurement data of the at least one reference railway vehicle, which wheel measurement data comprise measured values of the parameter of the wheel of the reference railway vehicle. Further, according to the invention, a function between the driving-related diagnostic data and the data of the wheel measurements is determined on the basis of a supervised learning algorithm by means of the evaluation unit. Moreover, the evaluation unit is fed with driving-related diagnostic data of the observed railway vehicle, which diagnostic data comprise driving-related properties, on which the parameter of the wheel of the observed railway vehicle depends. The parameter of the wheel of the observed railway vehicle is determined by the evaluation unit using the determined function and the diagnostic data of the observed railway vehicle The at least one reference railway vehicle may be the observed railway vehicle and/or at least one other railway vehicle. In a preferred embodiment of the invention, the evaluation unit is fed with driving-related diagnostic data of several reference railway vehicles and with wheel measurement data of that several railway vehicles.

SUMMARY OF THE INVENTION

The invention is based on the idea to use driving-related diagnostic data of a railway vehicle, which comprise driving-related properties, for determining the parameter of the wheel. Moreover, the invention is based on the finding that driving-related properties of the railway vehicle may influence the wheel wear, also wheel abrasion, directly. Hence, the driving-related diagnostic data may influence the parameter of the wheel directly.

Advantageously, the number of wheel measurements can be reduced by determining the parameter of the wheel of the observed railway vehicle on the basis of the (driving-related) diagnostic data of the observed railway vehicle.

Moreover, the parameter of the wheel of the observed railway vehicle may be determined on the basis of (particularly past) wheel measurement data of the observed railway vehicle. Additionally or alternatively, the parameter of the wheel of the observed railway vehicle may be determined on the basis of a known original/beginning state of the wheel.

Preferably, the parameter of the wheel of the observed railway vehicle is determined by the evaluation unit theoretically. Moreover, the parameter of the wheel of the observed railway vehicle may be predicted by the evaluation unit. The determined parameter may deviate from a real parameter, which can be measured. The determined parameter may be a present and/or a prospective/future parameter.

Further, the invention is based on the idea to use a supervised learning algorithm to determine the function between the driving-related diagnostic data and the data of the wheel measurements. Hence, the supervised learning algorithm may use the diagnostic data as input data.

The function, which is determined by means of the supervised learning algorithm, may be not extractable. Particularly, the function may be learned by means of the supervised learning algorithm.

The diagnostic data may comprise several data points (also datasets). Each of the data points may comprise at least one driving-related property, particularly several driving-related properties. Moreover, it is advantageous that each of the data points comprises a time stamp.

The driving-related property may comprise a sensor signal, particularly comprising a sensor value and a sensor identifier. Further, the driving-related property may comprise an error code. Hence, each data point (also dataset) may be a multidimensional data point, particularly a vector.

Moreover, the supervised learning algorithm may use the wheel measurement data of the reference railway vehicle as target values. The target values may be numbers, vectors or similar.

A target value in the meaning of the invention may be a desired output value, particularly of the supervised learning algorithm. The supervised learning algorithm may determine the function by means of the target value.

A progression of the parameter may be determined. Particularly, the progression may depend on time, on mileage and/or on another parameter. The progression may extend up to the present. Moreover, the progression may extend until the determined parameter reaches a given critical value. Advantageously, a point is determined, at which the parameter of the wheel of the observed railway vehicle reaches a given critical value, also trashold. The point may be a point of time, a mileage or similar. The point, at which the parameter of the wheel of the observed railway vehicle reaches a given critical value, may be determined by means of the progression.

In this way, it is predicted, when the parameter of the wheel of the observed railway vehicle reaches the given critical value. Particularly, a point of time may be predicted, at which the respective parameter of the wheel reaches the given critical value. Moreover, a mileage may be predicted, at which the respective parameter of the wheel reaches the given critical value.

Moreover, by means of the method it may be predicted, when/at which point a diameter difference of the wheel of the observed railway vehicle to another wheel at the same axle of the observed railway vehicle reaches a given critical value.

Preferably, when the parameter of the wheel of the observed railway vehicle reaches a given critical value, the wheel of the observed railway vehicle has to be re-profiled or exchanged. Further, it is advantageous that the wheel of the observed railway vehicle has to be re-profiled or exchanged, if the diameter difference to the other wheel at the same axle reaches a given critical value.

By means of the method, the point of time/the mileage, when a wheel of the observed railway vehicle has to be re-profiled and/or exchanged, can be predicted. Advantageously, the wheel is re-profiled and/or exchanged at the predicted point of time/at the predicted mileage. In this respect, the invention is related to a method for operating and/or repairing a railway vehicle, wherein the method named above (for determining wheel wear of a wheel of an observed railway vehicle) or an embodiment thereof is executed. When the parameter of the wheel reaches a given critical value, the wheel of the observed railway vehicle may be re-profiled and/or exchanged.

Preferentially, the determined parameter depends on the driving-related properties. Moreover, the determined parameter may depend on the wheel wear, also wheel abrasion.

It is advantageous that the determined parameter is a diameter. Moreover, preferably the determined parameter is a wheel flange height, also wheel crest height. Further, advantageously the determined parameter is a wheel flange width, also wheel crest width.

Further, it is preferred that the wheel measurement data comprise measured values of the diameter, measured values of the wheel flange height, and/or measured values of the wheel flange width, particularly of a (measured) wheel of the reference railway vehicle. Moreover, the wheel measurement data may comprise a time of the respective measurement.

Further, it is preferred that the wheel measurement data comprise measured values of that parameter, which preferably is of the same type as the determined parameter. Hence, advantageously the wheel parameter of the reference railway vehicle is of the same type as the determined parameter.

Moreover, the wheel measurement data may comprise an original/beginning state of the wheel of the reference railway vehicle. Particularly the wheel measurement data may comprise an original/beginning value of the parameter.

Advantageously, the diagnostic data of the railway vehicles are available for a given period of time, particularly for more than 1 year, preferably for a couple of years.

Expediently, the wheel of the observed railway vehicle is part of a wagon of the observed railway vehicle.

If the evaluation unit is fed with driving-related diagnostic data of several reference railway vehicles and with wheel measurement data of that several railway vehicles, preferably the diagnostic data of the several reference railway vehicles are sorted into categories. Particularly, the diagnostic data of the several reference railway vehicles may be sorted into categories according to the railway vehicle type, particularly according to the configuration of the respective railway vehicle. Moreover, the diagnostic data of the several railway vehicles may be sorted into categories according to the wagon type of the respective railway vehicle, particularly according to the weight of the wagons of the respective railway vehicle. Further, the diagnostic data of the several railway vehicles are sorted into categories according to the material type of the wheel of the respective railway vehicle. Moreover, the diagnostic data of the several railway vehicles are sorted into categories according to the breaking system type of the respective railway vehicle.

It is advantageous that the function is determined in dependency of the diagnostic data of these reference railway vehicles, which are in the same category as the observed railway vehicle.

Moreover, diagnostic data of these reference railway vehicles, which are in the same category as the observed railway vehicle, may outweigh diagnostic data of other reference railway vehicles. Thus, when determining the function, the weight of the respective diagnostic data may be taken into account.

Advantageously, the driving-related properties comprise mileage signals. Thus, the diagnostic data may comprise information regarding the mileage of the respective railway vehicle at different times. Particularly, the diagnostic data may comprise a temporal progression of the mileage of the respective railway vehicle. The mileage signals may be generated by means of an odometer and/or a tachometer. Further, the mileage signals may be determined on the basis of a location signal.

Further, it is preferred that the driving-related properties comprise speed signals. Thus, the diagnostic data may comprise information regarding the speed of the respective railway vehicle at different times. Particularly, the diagnostic data may comprise a temporal progression of the speed of the respective railway vehicle. The speed signals may be generated by means of a tachometer of the respective railway vehicle. Further, the speed signal may be determined on the basis of a location signal.

Moreover, it is advantageous that the driving-related properties comprise braking signals. Thus, the diagnostic data may comprise information regarding the braking of the respective railway vehicle at different times. Any of the braking signals may comprise a braking duration, how long the brakes of the respective railway vehicle are applied. Further, any of the braking signals may comprise a brake identifier, which specifies the applied type of brakes. Moreover, any of the braking signals may comprise a braking power/pressure, which was applied to the brakes.

Preferably, the driving-related properties comprise sliding signals. Thus, the diagnostic data may comprise information regarding the sliding of the respective railway vehicle at different times. Any of the sliding signals may comprise a sliding duration, how long the sliding of the respective railway vehicle occurs.

In a preferred embodiment of the invention, the driving-related properties comprise location signals. Thus, the diagnostic data may comprise information regarding the location of the respective railway vehicle at different times, particularly a temporal progression of the location of the respective railway vehicle. The location signals may be determined by means of global navigation satellite system (GNNS), particularly by means of global positioning system (GPS). Hence, the location signals may be GPS signals. Further, the location signals may be determined by means of balises.

The track driven by the respective railway vehicles may be reconstructed on the basis of the location signals of the respective railway vehicle. On the basis of the reconstructed track the information regarding the driven track may be determined. Information regarding the driven track may be driven curves and, if necessary, their sharpness, and/or the driven slopes and/or grades.

In a preferred embodiment of the invention, the information regarding the driven track is learned by means of the supervised learning algorithm.

Preferentially, the driving-related properties comprise anti-sliding signals. Thus, the diagnostic data may comprise information regarding influences of an anti-sliding system of the respective railway vehicle at different times. Any of the anti-sliding signals may comprise an anti-sliding duration, how long the anti-sliding system of the respective railway vehicle is engaged. The anti-sliding signals may be determined by means of the anti-sliding system of the respective railway vehicle.

Moreover, the driving-related properties may comprise torque signals of at least one motor of the respective railway vehicle. Thus, the diagnostic data may comprise information regarding the torque of the at least one motor of the respective railway vehicle at different times. Moreover, the diagnostic data may comprise information regarding torque differences between different motors of the respective railway vehicle at different times.

Further, the driving-related properties may comprise a weight of the wagons of the respective railway vehicle. Moreover, the driving-related properties may comprise a configuration of the respective railway vehicle. The configuration may comprise the number of wagons and/or the number of hauling engines of the respective railway vehicle respectively. Further, the configuration may comprise the sequence of wagons and/or of hauling engines of the respective railway vehicle.

Further, the driving-related properties may comprise axes-temperature signals, particularly if they extend a given range. Thus, the diagnostic data may comprise information regarding axes-temperatures of the respective railway vehicle at different times. Particularly if the axes-temperature extends a given range, for example during braking, it may influence the wheel wear and/or the parameter of the wheel.

Moreover, the driving-related properties may comprise outside-temperature signals and/or outside-humidity signals, particularly if they extend a given respective range. Thus, the diagnostic data may comprise information regarding outside-temperature and/or outside-humidity of the respective railway vehicle at different times. The outside-temperature and/or the outside-humidity may be a temperature/humidity of the environment.

The diagnostic data of the observed railway vehicle may comprise driving-related properties of the same type as the diagnostic data of the reference railway vehicle.

If the evaluation unit is fed with driving-related diagnostic data of several reference railway vehicles and with wheel measurement data of that several railway vehicles, advantageously completeness and plausibility of the diagnostic data of the several reference railway vehicle are checked. Preferably, the function is determined in dependency of the diagnostic data of this/these reference railway vehicle(s), whose diagnostic data are complete and plausible.

The wheel measurement data may comprise measured values of at least one parameter of the wheel of the reference railway vehicle. Preferentially, the wheel measurement data comprise measured values of a diameter, particularly of a measured wheel of the reference railway vehicle. Moreover, advantageously the wheel measurement data comprise measured values of a wheel flange height, particularly of the measured wheel of the reference railway vehicle. Further, the wheel measurement data may comprise measured values of a wheel flange width, particularly of the measured wheel of the reference railway vehicle. Preferably, the wheel measurement data comprise measured values of all three of the parameter of the wheels named above, particularly measured values of the diameter, of the wheel flange height and of the wheel flange width.

A parameter of a measured wheel may be a parameter of at least one measured wheel, particularly of all measured wheels, of the reference railway vehicle. Moreover, the wheel measurement data may comprise a time of the respective (wheel) measurement.

It is preferred that the measured wheel (of the reference railway vehicle) is of the same type as a wheel of the observed railway vehicle. Hence, the measured wheel may be made of the same wheel material as the wheel of the observed railway vehicle. Moreover, the measured wheel may be mounted at the same side of the railway vehicle (left/right in direction of travelling) as a wheel of the observed railway vehicle. Further, the measured wheel may be mounted at the same wagon type (at a non-motored wagon (trailing wheel)/at a hauling engine (driving wheel)) as a wheel of the observed railway vehicle. Moreover, the measured wheel may be a wheel of the same railway vehicle type, particularly with the same braking system type and/or with the same configuration, as the observed railway vehicle.

Preferentially, the function, which is determined, may be a function between the driving-related diagnostic data and the measured values of the at least one parameter of the wheel of those measured wheels (of the reference railway vehicle), which expediently are of the same type as the wheel of the observed railway vehicle.

By means of the method, several parameters of the wheel of the observed railway vehicle may be determined/monitored in the same way. Particularly, the several parameters to be determined may be several of the above mentioned determined parameter. For example, the several parameters to be determined may be at least two of the following, particularly all three of the following: a diameter of the wheel of the observed railway vehicle, a wheel flange height of the wheel of the observed railway vehicle, a wheel flange width of the wheel of the observed railway vehicle.

A supervised learning algorithm is used to determine the function. The supervised learning algorithm may comprise several cycles of approximation. The function determined by a later cycle of approximation may be more accurate than the function determined in the cycle before. To optimise the approximation (and thus the function), a backward propagation of errors ("backpropagation") may be performed.

Moreover, for the supervised learning algorithm, the provided data may be split into several data parts, particularly into training data, validation data, and test data. Hence, the evaluation unit may be fed with training data, validation data, and test data, particularly each having the same form.

Preferentially, the supervised learning algorithm utilises a recurrent neural network (RNN). The RNN may be a long short-term memory (LSTM) network. The RNN may be modified to the problem to be solved.

For creating the RNN, expediently an architecture of the RNN has to be adjusted to the diagnostic data and/or to the problem to be solved. Particularly, the architecture of the RNN may comprise a number of neurons, a number of layers, and/or the connection of neurons.

As mentioned above, the diagnostic data may comprise data points. Further, as mentioned above, each of the data points may comprise a time stamp. The time stamp may comprise an absolute time. Further, the time stamp may be comprise a relative time. For example, the time stamp can comprise a time difference to a foregoing data point. Moreover, a time difference of a data point to a foregoing data point may be calculated.

The time stamps of the data points and/or the time differences may be part of the input data, which are fed to the supervised learning algorithm. The abrasion behaviour may change over time, which expediently can be considered by taking the time stamp and/or the time differences into account.

In an advantageous embodiment of the invention, the data points from one wheel measurement to the next wheel measurement are grouped into one group by means of their time stamps. Moreover, the measured value of the parameter of the wheel, which has been measured in the latter wheel measurement, may be used as target value for the supervised learning algorithm, particularly for the above mentioned group of data points.

Advantageously, the data points may be grouped into several groups. Each group may comprise the data points from one wheel measurement to the next wheel measurement respectively. For example, the first group may comprise data point up to the first wheel measurement. Further, for example, the second group may comprise data point from the first wheel measurement up to the second wheel measurement.

The supervised learning algorithm may be a recurrent neural network, wherein the maximum number of data points per group may be determined. If the number of data points within any group is less than the determined maximum number, the respective group may be padded with Zeroes until the maximum number of data points is reached.

For example, by the grouping of the data points into groups, particularly by means of their time stamp, several matrixes may be created. Each of the matrixes may comprise the data points of one group. The maximum size of the matrixes can be determined (as a maximum number of data points per group). Moreover, if the size of any of the matrixes is less than the maximum size, the respective matrix may be padded with Zeroes until the maximum size is reached.

The wheel measurement data may be used as target values for the groups. For example, the measured value of the parameter, which has been measured within a first wheel measurement, may be used as target value for the first group, and so on.

According to a preferred embodiment of the invention, the diagnostic data is split into segments with a given number of data points. The data points within any segment may be consecutive. Moreover, the segments may be consecutive. Further, the RNN may be modified in that interpolated wheel measurement data may be used as target values. Interpolated wheel measurement data may be interpolated values of the measured parameter of the wheel.

For example, a given number of consecutive data points may form a matrix. Hence, the diagnostic data may be split into (particularly consecutive) matrixes with a given number of (particularly consecutive) data points. The time difference between the first data point and the last data point of a matrix, particularly between the time stamp of the first data point and the time stamp of the last data point of a matrix, may be less than the time difference between two wheel measurements. Interpolated data from the wheel measurements may be used as target values. Each of the target values may be a target value at a time, which is equal to the time stamp of the last data point of the respective segment. Hence, each of the target values may be a target value at a time, which may be equal to the time stamp of the last data point of the respective matrix.

In the first cycle of approximation the interpolation may be done by any function. The resulted function may be used for the interpolation within the next cycle of approximation.

Moreover, a first approximation may be done by only using the wheel measurement data as target values. Following approximations may be done by using the interpolated wheel measurement data as target values, wherein the resulted function of the first approximation may be used for the interpolation.

The invention and/or the described embodiments thereof may be realised—at least partially or completely—in software and/or in hardware, latter e.g. by means of a special electrical circuit.

Further, the invention and/or the described embodiments thereof may be realised—at least partially or completely—by means of a computer readable medium having a computer program, which computer program, when executed on a computer, realises the method according to the invention and/or according to the embodiments thereof.

Further, the invention is related to an evaluation unit for determining a parameter of a wheel of an observed railway vehicle. According to the invention, the evaluation unit is embodied to execute the steps described above.

Hence, the evaluation unit is embodied to be fed with driving-related diagnostic data of at least one reference railway vehicle, which diagnostic data comprise driving-related properties, on which a parameter of a wheel of the reference railway vehicle depends. Moreover, the evaluation unit is embodied to be fed with wheel measurement data of the at least one reference railway vehicle, which wheel measurement data comprise measured values of the parameter of the wheel of the reference railway vehicle. Further, according to the invention, the evaluation unit is embodied to determine a function between the driving-related diagnostic data and the data of the wheel measurements on the basis of a supervised learning algorithm. Moreover, the evaluation unit is embodied to be fed with driving-related diagnostic data of the observed railway vehicle, which diagnostic data comprise driving-related properties, on which the parameter of the wheel of the observed railway vehicle depends. Additionally, the evaluation unit is embodied to determine the parameter of the wheel of the observed railway vehicle by using the determined function and the diagnostic data of the observed railway vehicle.

Features, which are mentioned in connection with the method, may also refer to the evaluation unit.

Even if terms are used in the singular or in a specific numeral form, the scope of the invention should not be restricted to the singular or the specific numeral form.

The previously given description of advantageous embodiments of the invention contains numerous features which are partially combined with one another in the dependent claims. Expediently, these features can also be considered individually and be combined with one another into further suitable combinations. More particularly, these features may be combined with the evaluation unit and the method according to the respective independent claim individually as well as in any suitable combination. Furthermore, features of the method, formulated as apparatus features, may be considered as features of the evaluation unit and, accordingly, features of the evaluation unit, formulated as process features, may be considered as features of the method.

The above-described characteristics, features and advantages of the invention, and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments, and/or be combined with any of the appended claims.

DESCRIPTION OF THE INVENTION

Figure 1:
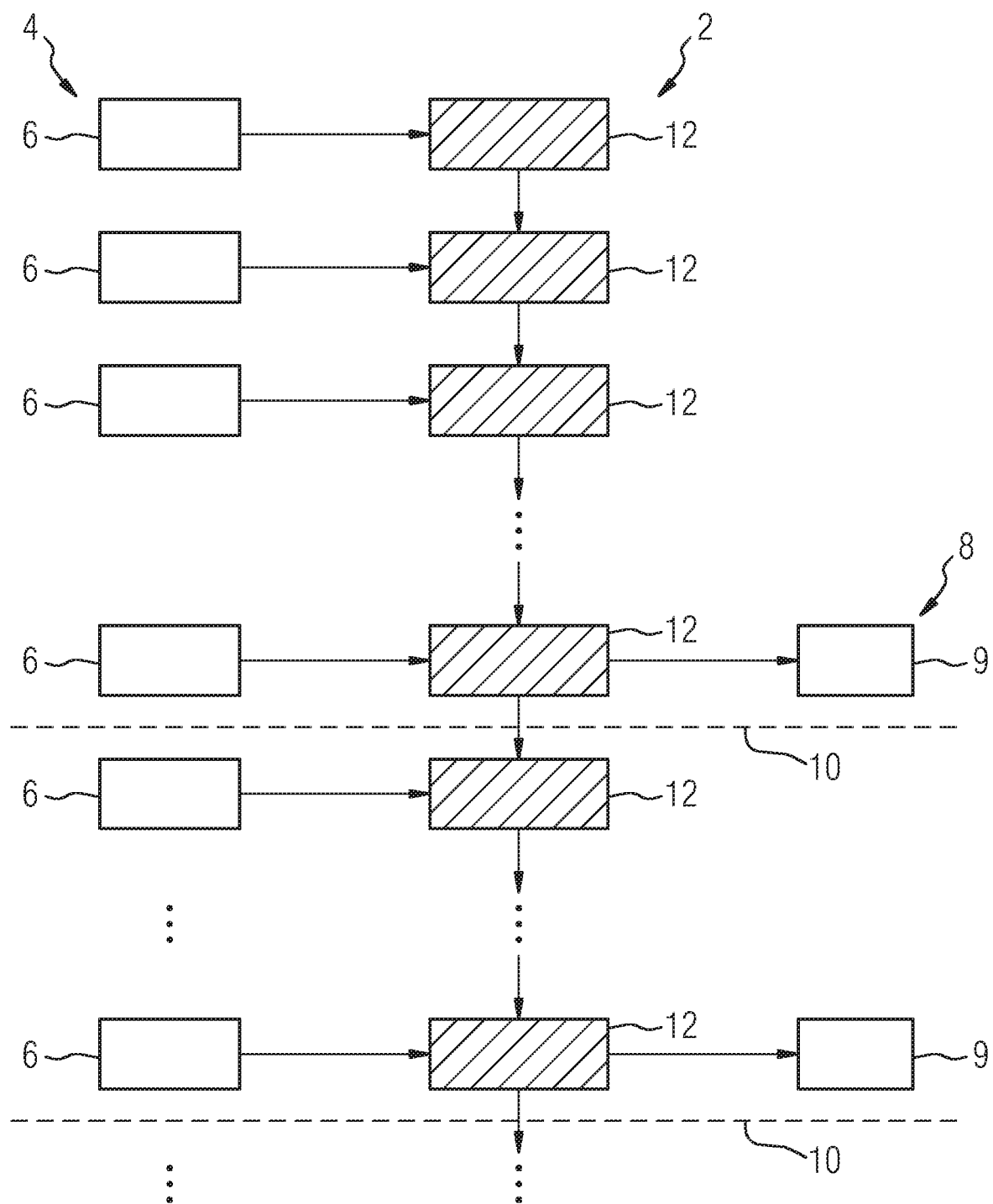
FIG. 1 a schematic overview of a supervised learning algorithm to determine a function, which is used to determine a parameter of a wheel of an observed railway vehicle.

FIG. 1 schematically shows a supervised learning algorithm 2. The supervised learning algorithm utilises a recurrent neural network (RNN), here a long short-term memory (LSTM) network. An evaluation unit (not shown) determines a function by means of the supervised learning algorithm 2, which function is used to determine a parameter of a wheel of an observed railway vehicle.

The evaluation unit is fed with driving-related diagnostic data 4 of at least one reference railway vehicle as input data. The diagnostic data 4 comprises driving-related properties, on which a parameter of the wheel of the reference railway vehicle depends. The diagnostic data 4 comprises several data points 6, which are fed to the evaluation unit.

Further, the evaluation unit is fed with wheel measurement data 8 of the at least one reference railway vehicle as target data. The wheel measurement data 8 comprise measured values 9 of the parameter of the wheel of the at least one reference railway vehicle.

The data points 6 of the diagnostic data 4 are grouped into groups and/or into time intervals by means of time stamps of the data points. An interval is the time from one wheel measurement to the next wheel measurement. Further, a group comprises the diagnostic data 4 with a time stamp from one wheel measurement to the next wheel measurement. In FIG. 1, a dashed line 10 shows the border of two intervals/groups schematically.

The architecture of the RNN is given. Moreover, the architecture of the RNN can be adjusted manually before and/or after each cycle of approximation done by the supervised learning algorithm 2.

The first data point 6 is a data point 6 with the earliest time stamp. The first data point 6 is fed to the RNN in its first state 12 (illustrated as first/top shaded box). The result fed together with the next data point 6 to the RNN in its state 12 (at that time), and so on. The wheel measurement data 8 is used as target values at the end of each interval. Hence, the wheel measurement data 8 is used as target values for the groups. The procedure using the RNN is known from elsewhere.

With this procedure, the RNN learns the function between the driving-related diagnostic data 4 and the wheel measurement data 8.

The function between the driving-related diagnostic data 4 and the wheel measurement data 8 is determined on the basis of the supervised learning algorithm 2 by means of the evaluation unit.

The first gained function may be a first approximation. However, executing the supervised learning algorithm 2 for several cycles will lead to a better approximation, and—hence—to a better function.

The parameter of the wheel of the observed railway vehicle is determined by means of the determined function on the basis of the diagnostic data of the observed railway vehicle. Therefore, the RNN (in its resulted state) is fed with the diagnostic data of the observed railway vehicle. Moreover, wheel measurement data of the observed railway vehicle may be used as target values.

The determined parameter is a parameter at a time and/or mileage after the latest wheel measurement of the observed railway vehicle.

The determined parameter may be a present parameter and/or a future parameter.

Figure 2:
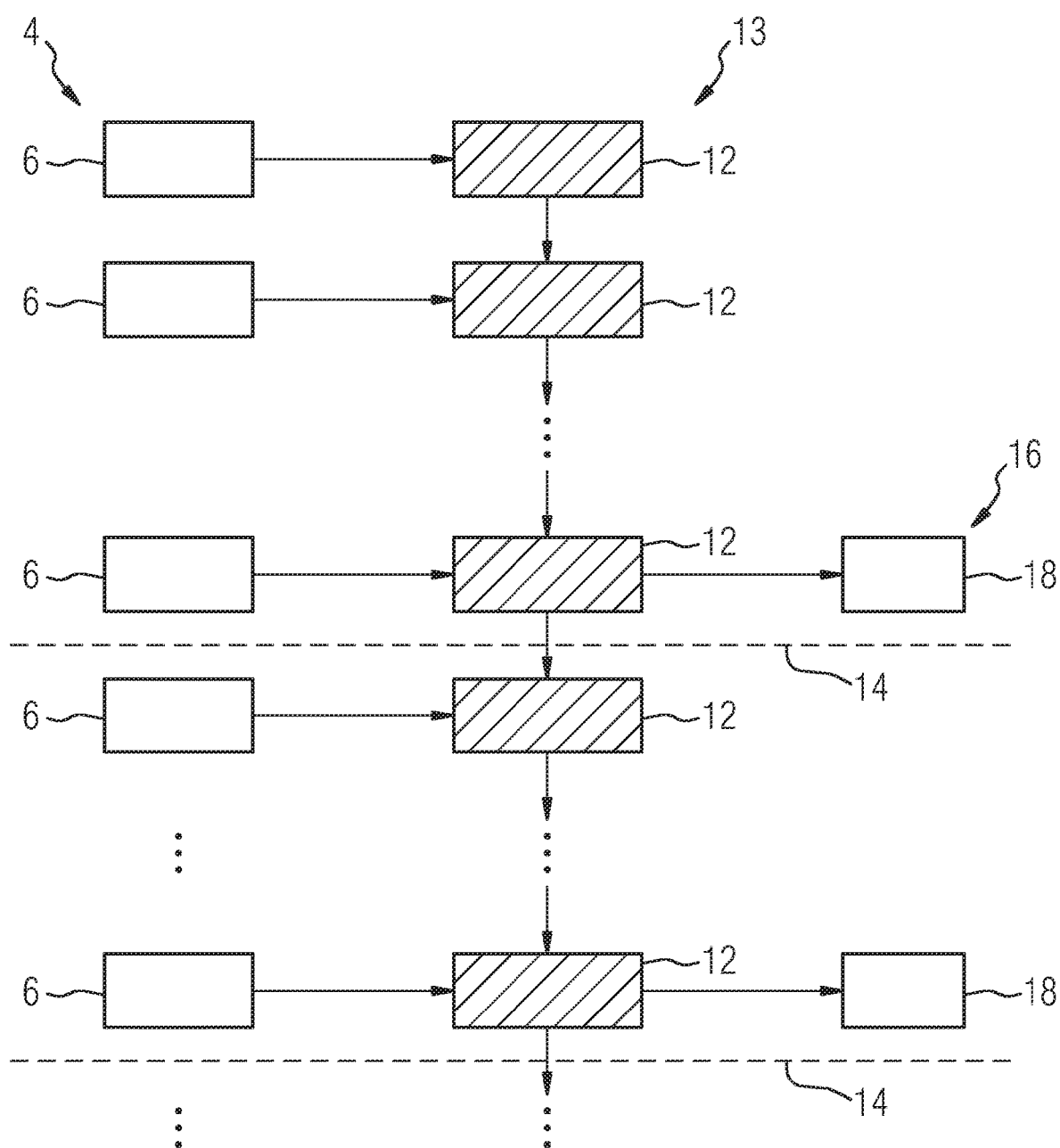
FIG. 2 a schematic overview of a further supervised learning algorithm to determine the function.

FIG. 2 shows schematically an analogous supervised learning algorithm 13.

The following description is restricted essentially to the differences from the embodiment of FIG. 1, to which is referred regarding unchanged features and functions. Essentially identical elements are generally denoted by the same reference numbers, and not mentioned features are included in the following embodiment without being described again.

In this case, the diagnostic data 4 are split into segments with a given number of data points 6. In FIG. 2, a dashed line 14 schematically shows the border of two segments.

Interpolated wheel measurement data 16 are used as target values. The interpolated wheel measurement data 16 comprise interpolated values 18 of the measured parameter of the wheels.

Any function may be used for the interpolation in the first cycle of the supervised learning algorithm 13. However, a function gained by the method described in FIG. 1 may be used for the interpolation in the first cycle of the supervised learning algorithm 13.

The resulted function of the supervised learning algorithm 13 may be used for the interpolation within the next cycle of approximation/within the next cycle of the supervised learning algorithm.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any equivalents thereof.

The invention claimed is:

1. A method for determining a parameter of a wheel of an observed railway vehicle, the method comprising:
    supplying an evaluation unit with driving-related diagnostic data of at least one reference railway vehicle, the diagnostic data containing driving-related properties on which the parameter of a wheel of the reference railway vehicle depends;
    supplying the evaluation unit with wheel measurement data of the at least one reference railway vehicle, the wheel measurement data containing measured values of the parameter of the wheel of the reference railway vehicle;

determining with the evaluation unit a function between the driving-related diagnostic data and the wheel measurement data based on a supervised learning algorithm;

supplying the evaluation unit with driving-related diagnostic data of the observed railway vehicle, the diagnostic data containing driving-related properties on which the parameter of the wheel of the observed railway vehicle depends;

determining with the evaluation unit the parameter of the wheel of the observed railway vehicle using the determined function and the diagnostic data of the observed railway vehicle; and determining a progression of the parameter and determining a point at which the parameter of the wheel of the observed railway vehicle reaches a given critical value.

2. The method according to claim 1, wherein the parameter of the wheel is a parameter selected from the group consisting of a diameter, a wheel flange height, and a wheel flange width.

3. The method according to claim 1, which comprises feeding to the evaluation unit driving-related diagnostic data of a plurality of reference railway vehicles, and sorting the diagnostic data of the plurality of reference railway vehicles into categories selected from the group consisting of:
  a railway vehicle type;
  a wagon type of the respective railway vehicle,
  a material type of the wheel of the respective railway vehicle; and
  a breaking system type of the respective railway vehicle;
  and determining the function in dependence on the diagnostic data of those reference railway vehicles which are in the same category as the observed railway vehicle.

4. The method according to claim 1, wherein the driving-related properties are properties selected from the group consisting of mileage signals, speed signals, braking signals, and sliding signals.

5. The method according to claim 1, wherein the driving-related properties comprise location signals.

6. The method according to claim 5, wherein the location signals are GPS signals.

7. The method according to claim 1, wherein:
  the driving-related properties comprise anti-sliding signals; and/or
  the driving-related properties comprise torque signals of at least one motor of the respective railway vehicle.

8. The method according to claim 1, wherein the driving-related properties comprise a weight of the train cars of the respective railway vehicle and/or a configuration of the respective railway vehicle.

9. The method according to claim 1, wherein the driving-related properties comprise axle-temperature signals, ambient-temperature signals, and/or ambient-humidity signals extending over a given time range.

10. The method according to claim 1, wherein, if the evaluation unit is fed with driving-related diagnostic data of several reference railway vehicles, checking for completeness and plausibility of the diagnostic data of the several reference railway vehicles and determining the function in dependency of the diagnostic data of those reference railway vehicles, whose diagnostic data are complete and plausible.

11. The method according to claim 1, wherein the supervised learning algorithm is configured to utilize a recurrent neural network.

12. The method according to claim 1, wherein the diagnostic data comprise data points and each of the data points comprises a time stamp.

13. The method according to claim 12, which comprises:
  grouping the data points from one wheel measurement to a next wheel measurement into one group by way of the time stamps thereof; and
  using the measured value of the parameter of the wheel, which has been measured in the next wheel measurement, as a target value for the supervised learning algorithm.

14. The method according to claim 13, which comprises using the measured value of the parameter of the wheel, which has been measured in the next wheel measurement, as a target value for the group of data points.

15. The method according to claim 1, which comprises splitting the diagnostic data into segments with a given number of data points and using interpolated wheel measurement data as target values.

16. An evaluation unit for determining a parameter of a wheel of an observed railway vehicle, the evaluation unit being configured to:
  receive driving-related diagnostic data of at least one reference railway vehicle, the diagnostic data comprising driving-related properties, on which the parameter of a wheel of the reference railway vehicle depends;
  receive wheel measurement data of the at least one reference railway vehicle, the wheel measurement data comprising measured values of the parameter of the wheel of the reference railway vehicle;
  determine a function between the driving-related diagnostic data and the wheel measurement data on a basis of a supervised learning algorithm;
  receive driving-related diagnostic data of the observed railway vehicle, the diagnostic data comprising driving-related properties, on which the parameter of the wheel of the observed railway vehicle depends;
  determine the parameter of the wheel of the observed railway vehicle by using the determined function and the diagnostic data of the observed railway vehicle; and
  determine a progression of the parameter and determine a point at which the parameter of the wheel of the observed railway vehicle reaches a given critical value.

* * * * *